United States Patent [19]
Tudisco

[11] 3,955,302
[45] May 11, 1976

[54] FISHING GAFF

[76] Inventor: Vincent J. Tudisco, 19 Linwood Ave., Emerson, N.J. 07636

[22] Filed: May 8, 1975

[21] Appl. No.: 575,516

[52] U.S. Cl. .......................................... 43/6; 294/26
[51] Int. Cl.² ............................................ A01K 97/14
[58] Field of Search ................. 43/5, 6, 44.86, 53.5; 294/26

[56] References Cited
UNITED STATES PATENTS

| 1,264,658 | 4/1918 | King | 43/44.86 |
| 3,803,742 | 4/1974 | Foster | 43/6 |

Primary Examiner—Warner H. Camp
Attorney, Agent, or Firm—Jack Matalon

[57] ABSTRACT

An improved fishing gaff having a hook with an elongated shaft, a handle comprising a tubular member and a cylindrical supporting member to receive the shaft and the handle. The supporting member has a length equal at least that of the shaft and has a channel disposed on its outer surface for receiving the shaft. The width and depth of the channel are equal to or less than the o.d. of the shaft and the supporting member contains means to restrict its length of insertion in the tubular member. When the shaft is inserted in the channel and the supporting member is inserted in the handle, axial and rotational movement of both the shaft and the supporting member are restricted.

3 Claims, 3 Drawing Figures

U.S. Patent  May 11, 1976  3,955,302
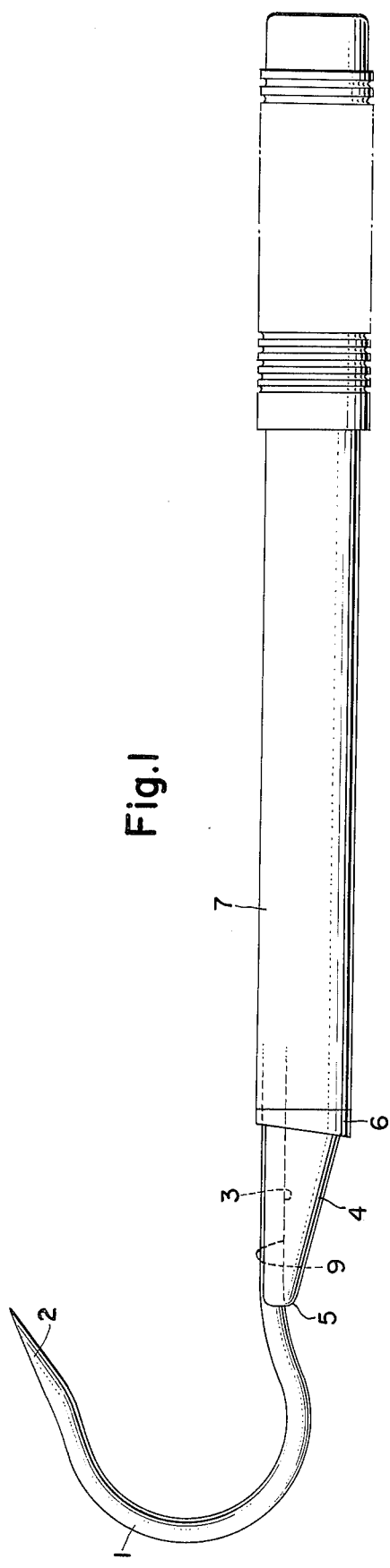
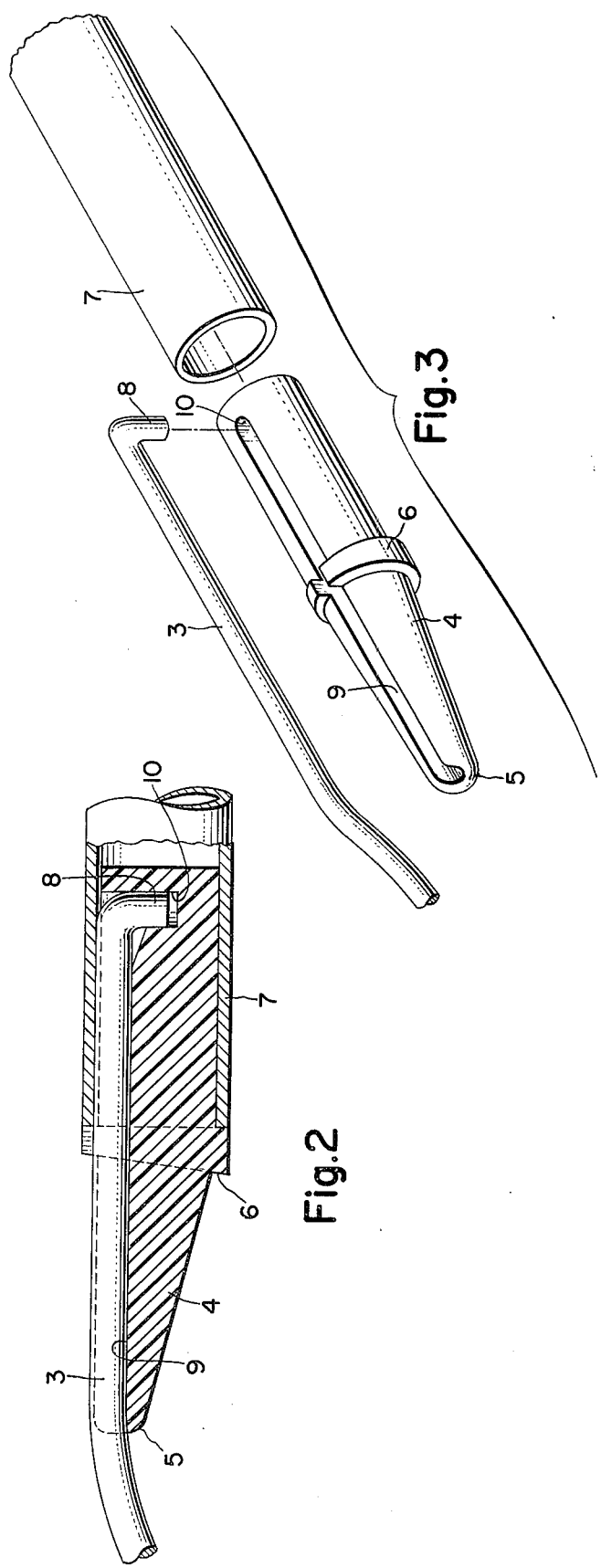

FISHING GAFF

This invention relates to an improved fishing gaff. Fishing gaffs comprising a hook having a hook point (or barb) and an elongated shaft, a supporting member for the hook and a handle, i.e. a tubular member, for receiving the combination of hook and supporting member are well known in the prior art. However, the supporting member used in the prior art frequently allows (after gaffing the thrashing fish) the shaft to be bent back, thereby dislodging the gaffing hook from the body of the fish. In many cases, the entire fishing gaff is ruined when the hook is bent back, since it frequently develops that the supporting member becomes distorted and incapable of retaining the gaffing hook.

In this invention, the supporting member supports the entire length of the elongated shaft. Further, the supporting member retains the shaft and is itself retained in the tubular member in a manner so as to permit substantially no rotary or axial movement of the shaft or the supporting member.

This invention will be better understood by reference to the drawings in which:

FIG. 1 is a perspective view of the gaff in which the hook is inserted in the supporting member which in turn is inserted in the tubular member.

FIG. 2 is a cross-sectional view showing, in detail, a portion of the shaft mated with the supporting member.

FIG. 3 is an exploded top view showing the shaft about to be inserted in the supporting member prior to insertion of the latter in the tubular member.

Referring in detail to the drawings in which like numbers refer to like features:

In FIG. 1, gaffing hook 1 has a barb or hook point 2 and an elongated shaft 3. Hook 1 is inserted in a channel in supporting member 4 (the channel is discussed with reference to FIG. 2 and FIG. 3). Supporting member 4 is cylindrical in shape but preferably that portion extending outwardly from tubular member 7 is tapered such that at the apex 5, the diameter thereof is substantially equal to the o.d. of shaft 3. Supporting member 4 has a shoulder 6, located approximately at the midpoint of the length of supporting member 4 to restrict the length of insertion of supporting member 4 in tubular member 7. The portion of the supporting member 4 inserted in tubular member 7 has an o.d. slightly (e.g. 0.001–0.010 inch) greater than the i.d. of tubular member 7. Furthermore, the overall length of supporting member 4 must be such that it is equal to and preferably slightly (e.g. 1/16–¼ inch) greater than the length of shaft 3. In its preferable mode, apex 5 will contact shaft 3 at the point of or slightly before the commencement of the curvature between shaft 3 and hook point 2.

In FIG. 2 and FIG. 3, channel 9 for retaining shaft 3 is readily visible. Channel 9 is parallel to the longitudinal axis of shaft 3 and has a depth and width equal to or slightly (e.g. 001–005 inch) less than the o.d. of shaft 3. The length of channel 9 is such that it is slightly (e.g. 1/16–¼ inch) less than the overall length of supporting member 4. Shaft 3 preferably is bent at right angles at its free extremity so as to form segment 8. Channel 9 preferably terminates in aperture 10 having a diameter (and angle relative to the main axis of channel 9) to allow a tight mating with segment 8. Aperture 10 may have a depth equal to, and preferably slightly greater than, the length of segment 8. Segment 8 may be at an angle of 45°–90° relative to shaft 3, although a right angle is preferred. Further, it may be desirable (e.g. where shaft 3 has a large o.d.) to have a plug or bolt affixed (e.g. by welding) to the end of shaft 3, rather than bending the terminal end of shaft 3 to form segment 8.

In assembling the fishing gaff, segment 8 is inserted into aperture 10 and shaft 3 is pressed into channel 9 (shaft 3 will thus be coextensive with, or protrude slightly from, the outer surface of supporting member 4. Since supporting member 4 has an o.d. slightly (e.g. 0.001–0.010 inch) greater than the i.d. of tubular member 7, the combination of shaft 3 and supporting member 4 must be forcefully inserted, e.g. press fitted, into tubular member 7 up to shoulder 6. When this is done, neither shaft 3 nor supporting member 4 exhibit any significant rotary or axial movement.

The materials useful for this fishing gaff are conventional. For example, hook 1 may be constructed of mild steel, stainless steel, etc. Supporting member 4 may be constructed of high strength, machinable or moldable materials such as "Delrin", "Teflon", glass fiber-reinforced thermosetting or thermoplastic polymers, aluminum, etc. Typically tubular member 7 is constructed of materials such as aluminum, steel, thermosetting or thermoplastic polymers, etc.

What is claimed is:

1. In a fishing gaff having a hook with an elongated shaft, a handle comprising a tubular member and a cylindrical supporting member for attaching the hook to the handle, the improvement which comprises: said cylindrical supporting member having (a) a length equal to at least that of the elongated shaft; (b) a channel disposed on its outer surface parallel to the longitudinal axis of the elongated shaft, said channel having (1) a length less than that of the supporting member, (2) a width equal to or less than the o.d. of the shaft and a depth equal to or less than the o.d. of the shaft; (c) means to restrict the length of insertion of the supporting member in said tubular member; and (d) an o.d. greater than the i.d. of the tubular member, such that when the shaft is inserted in said channel and the supporting member containing said shaft is inserted in said tubular member, axial and rotational movement of the shaft relative to the supporting member and of the supporting member relative to the tubular member are restricted, a portion of the supporting member extends outwardly from the tubular member and is tapered such that at the apex of said portion, the diameter of the supporting member is substantially equal to the o.d. of the elongated shaft.

2. The gaff of claim 1 in which the supporting member has a length greater than that of the elongated shaft.

3. The gaff of claim 1 in which the channel terminates in an aperture disposed in the supporting member at an angle to the longitudinal axis of the channel and the free extremity of the elongated shaft is adapted to mate with said aperture.

* * * * *